United States Patent
Spruce et al.

(10) Patent No.: US 10,294,922 B2
(45) Date of Patent: May 21, 2019

(54) CONTROL OF A GROUP OF WIND TURBINES

(71) Applicant: VESTAS WIND SYSTEMS A/S, Aarhus N (DK)

(72) Inventors: Chris Spruce, Leatherhead (GB); Kelvin Hales, Surrey (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 227 days.

(21) Appl. No.: 15/125,931

(22) PCT Filed: Mar. 13, 2014

(86) PCT No.: PCT/DK2014/050060
§ 371 (c)(1),
(2) Date: Sep. 13, 2016

(87) PCT Pub. No.: WO2015/135547
PCT Pub. Date: Sep. 17, 2015

(65) Prior Publication Data
US 2017/0002796 A1   Jan. 5, 2017

(51) Int. Cl.
*F03D 7/02* (2006.01)
*F03D 7/04* (2006.01)
*G05B 19/042* (2006.01)

(52) U.S. Cl.
CPC ......... *F03D 7/0292* (2013.01); *F03D 7/0284* (2013.01); *F03D 7/048* (2013.01); *G05B 19/042* (2013.01); *F05B 2220/706* (2013.01); *F05B 2240/21* (2013.01); *F05B 2240/50* (2013.01); *F05B 2240/912* (2013.01); *F05B 2260/40* (2013.01); *F05B 2270/337* (2013.01); *G05B 2219/2619* (2013.01); *Y02E 10/723* (2013.01); *Y02E 10/725* (2013.01); *Y02E 10/728* (2013.01)

(58) Field of Classification Search
None
See application file for complete search history.

(56) References Cited

U.S. PATENT DOCUMENTS

| | | | |
|---|---|---|---|
| 2006/0273595 A1* | 12/2006 | Avagliano | F03D 7/028 290/44 |
| 2007/0124025 A1 | 5/2007 | Schram et al. | |
| 2009/0160187 A1* | 6/2009 | Scholte-Wassink | F03D 7/0284 290/44 |
| 2009/0180875 A1* | 7/2009 | Egedal | F03D 7/0292 416/43 |

(Continued)

FOREIGN PATENT DOCUMENTS

WO   2013/000473 A1   1/2013

OTHER PUBLICATIONS

International Search Report for PCT/DK2014/050060, dated Oct. 15, 2014.

*Primary Examiner* — Tuan C Dao
(74) *Attorney, Agent, or Firm* — Patterson + Sheridan, LLP

(57) ABSTRACT

Methods and systems for reducing an output power of a group of wind turbines are provided. A measure of life usage by at least one component of each of a plurality of the turbines is determined, and is compared to a threshold value for life usage for the component. Power output is preferentially reduced from those turbines having at least one component for which the measure of life usage exceeds the corresponding threshold value.

13 Claims, 4 Drawing Sheets

(56) References Cited

U.S. PATENT DOCUMENTS

| | | | |
|---|---|---|---|
| 2010/0060001 A1* | 3/2010 | Gabrys | F03D 3/005 290/44 |
| 2010/0283246 A1* | 11/2010 | Christensen | F03D 7/0292 290/44 |
| 2011/0123331 A1* | 5/2011 | Stiesdal | F03D 7/0292 416/1 |
| 2011/0140428 A1* | 6/2011 | Wakata | F03D 7/0284 290/44 |
| 2014/0015252 A1* | 1/2014 | Zhu | F03D 7/0288 290/44 |

* cited by examiner

CONTROL OF A GROUP OF WIND TURBINES

The present invention relates to control of wind power systems. In particular, the invention relates to means and methods for reducing the output power of a group of wind turbines, such as a wind power generation plant, in which the power generated by wind turbines in the group is decreased in a selective manner.

Typically, commercial wind power generation is realised by operating a plurality of individual wind turbines together as part of a larger wind power plant (WPP). The WPP is connected to a transmission network, by way of which it supplies power to a utility grid. The fraction of the overall demand for electricity in a given period that is provided by wind power is referred to as wind energy penetration. Recently, annual wind energy penetration levels in some areas have reach around 25% or more, while instantaneous wind energy penetration has been known to approach 60%.

Increasing penetration of renewable energy resources such as wind power is often seen as a positive trend. However, there may be times at which power generation by a WPP exceeds acceptable levels. Most commonly, the amount of electricity that can be delivered from a WPP to a local grid is restricted by limited transmission capabilities or other network constraints. Transport limitations are especially prevalent in some regions, where rapid development of new wind energy installations has not been matched by corresponding improvements to transmission infrastructure, which can be relatively expensive and slow to implement.

Furthermore, the energy generated and sent to a grid by one or more WPPs may at times exceed the demand on that grid for immediate power delivery. This can happen for example when demand is low, such as during night hours or in summer time. In addition, a grid operator may be required to respect minimum operating levels on other generation systems, such as conventional plants, which can mean that there is reduced capacity to accommodate wind power within the utility system.

In view of these considerations, it is not uncommon for a utility operator to demand that the amount of power output to a grid by a WPP be reduced from its prevailing level. Indeed, it is thought that such curtailment commands are likely to become more commonplace in the future, as wind energy penetration levels grow.

A demand for curtailment may be formulated in a number of ways. In the first instance, the power purchase agreement itself between a WPP operator and a utility supplier may include curtailment provisions at the outset. For example, absolute contractual limits may be placed on the overall quantity of electricity that the utility operator will accept from the WPP. Similarly, a wind energy provider may be required to undertake that it will curtail its production whenever system conditions should require that it does so. Traditionally, curtailment decisions are made by systems operators. These decisions have to take into account market and other conditions, and must be made in real-time. More recently, this manual approach to curtailment is being increasingly replaced with market-based mechanisms, in which the operator of a WPP may make an offer in a real-time market that is based on forecast production for a given interval and which includes a willingness to curtail. In this case, curtailment commands may be generated and reviewed automatically.

Aside from curtailment to satisfy the needs of an external grid operator, there exist various further instances in which a need to cut back the collective power output of a group of turbines can arise as a result of one or more factors relating to their operation.

As one example, individual turbines within a WPP may be grouped into clusters. This type of arrangement may result from the particular physical characteristics of the plant site, for example. The turbines within each cluster typically deliver their output power onto a local power collection system. The power collectors, which may include local substations, are in turn interconnected with the utility grid. The topology of the overall power collection arrangement of a WPP will vary depending, among other factors, on site geography and soil characteristics.

These power collection systems, internal to the WPP, are in their own right characterised by particular operational limitations and constraints. These include, by way of example, surge impedance loading limits, thermal limits and voltage drop limits. These and other similar constraints may be monitored during operation of the WPP, and in the event that a limit is approached or exceeded a corresponding alarm signal may be generated. As a result, a decision may be taken actively to reduce the collective power output of the group or cluster of turbines in question.

FIG. 1 is a simplified illustration of one example of a conventional WPP 1. The plant comprises a plurality of wind turbines 2, each of which communicates bi-directionally with a power plant controller (PPC) 3. The turbines output power to a grid connection point 4, as illustrated by the thick line 5. As discussed above the transmission of the power output by each turbine may, in more complex arrangements, involve localised power collection systems at one or more points between the turbines and the grid itself. The power output to the grid by the WPP is simply the sum total of the power generated by each of the individual turbines 2.

The PPC 3 is shown schematically for ease of illustration. The PPC sends operational commands, including but not limited to power set points, to each of the turbines. The PPC also receives various inputs from the turbines, in particular data relating to the current values of turbine operating parameters, as well as alarm and other signals from elsewhere in the plant.

Though not shown in the drawing, the PPC further receives external commands from the grid. Specifically, where a downstream utility requires the WPP to adjust its active or reactive power output, a command or instruction to this effect is sent from the grid operator to the central plant controller 3.

Upon receiving a request to reduce the generation of electricity by the WPP or a group of turbines within it, the PPC will typically send an instruction the various wind turbines to lower the amount of power that they are generating. For example, the PPC may issue an instruction to each turbine to reduce its output power by, say, 10 kW.

This invention aims to provide improved means and methods for reducing the collective output power of a group of wind turbines.

SUMMARY OF THE INVENTION

The invention is defined in the independent claims, to which reference is now directed. Preferred features are set forth in dependent claims.

According to the invention there is provided a method for reducing an output power of a group of wind turbines in response to a request to reduce the output power. The method comprises the steps of determining a measure of life usage by at least one component of each of a plurality of turbines within the group by applying a life usage algorithm to values of one or more variables affecting the life usage, these values being obtained using turbine sensors; providing a threshold value for life usage; identifying a subset of the plurality of turbines, turbines in the subset having a component with a life usage greater than the threshold; and providing power set points for the identified turbines to reduce the power generated by each of them.

The method of the present invention is adapted to reduce selectively the power output of certain wind turbines within a group in response to a request to reduce overall power, based on measures of life usage for components of the turbines in the group. In this way, the power can be reduced for those turbines having one or more components with a relatively high level of fatigue, whilst the power output for those turbines having components with lower levels of fatigue is retained.

Wind turbine components are designed to withstand a finite amount of damage, beyond which their operation may become unreliable or unsafe. This is referred to as the fatigue life of a component. The amount of time for which a turbine can operate before this fatigue life is consumed is known as the component's lifetime. Typically, large commercial wind turbines are designed for a lifetime of around twenty years, and the maximum power output at which a turbine is rated will take this target lifetime into account.

Here, the term 'fatigue' is used generally to refer to any kind of wearing with age of a turbine or of its individual component parts. Thus, the fatigue life of a mechanical component may indicate the material stress that that part is designed to endure, while the 'fatigue life of a power cable', for instance, may refer to the chemical degradation of the cable insulation that continual resistive heating inevitably incurs. Similarly, the terms 'load', 'operational load' and 'fatigue load' as used interchangeably in the following may refer to mechanical and structural fatigue loads, such as bending moments and other forces. However, they may also be used to indicate any other factor that may affect the lifetime of a component, such as operational temperatures. The intended meaning will in all cases be clear from the context.

A number of influencing factors can affect the rate at which a turbine component fatigues, and each of the numerous parts within a single wind turbine will wear at a rate that depends differently on each of those factors. Furthermore, as will be appreciated, wind and other conditions vary constantly not only in time but also across the geographical extent of a set of turbines. This is especially so in the case of installations of large commercial wind turbines, the rotors of which now routinely exceed 100 m in diameter, and in the case of utility-scale WPPs that can include several hundreds of individual turbines. In addition, inter-turbine wake effects mean that both the speed and the turbulence of the wind incident upon any one turbine will differ from those at other points within the plant.

Thus, if allowed to operate continuously with minimal intervening control, it is to be expected that the components of the various turbines within a WPP will wear unevenly over time. Accordingly, when a power reduction request is received, embodiments of the invention reduce the power generation preferentially from those turbines that have accumulated the greatest consumption of their fatigue life. This is achieved by making use of life usage estimates (LUEs) that are calculated, in real-time, on the basis of the loads and stresses actually endured by wind turbine parts in their operation until the current time. In this way, component life usage may be balanced across the group of wind turbines.

This may advantageously mean that maintenance operations of some or all of the turbines may be co-ordinated, with maintenance costs reduced as a result. In preferred embodiments of the invention, LUEs are expressed as absolute values. For example, an LUE for a particular turbine component may be expressed as a fraction of the total fatigue life of that component. This may have the advantage that the comparison of the LUEs from turbine to turbine or to a threshold value, described below, becomes more objective and/or more straightforward.

Moreover, it can be the case that some turbine components experience wear at a rate lower than that expected. This may translate directly into those components continuing to be functional beyond the twenty-year lifetime with which they are designed. Application of the methods disclosed here may have the advantage that this prolonged serviceable lifetime can be identified and may apply to a greater proportion of the turbines within a group or plant. Thus, it may be possible to continue operation for a greater time period before turbine maintenance or replacement becomes necessary. This may be particularly advantageous where turbine replacement is difficult and/or expensive, such as in the case of large off-shore installations. It may also mean that unnecessary replacement is avoided, together with the associated costs.

As will be clear to the skilled person, methods according to the invention may be applied to reduce the current output power of a group of turbines whether this corresponds to a rated power or to another value, which may be above or below the rated level.

The individual wind turbines within a wind generation plant are each commonly equipped with a turbine controller. Such a controller may or may not be housed within the nacelle of the corresponding turbine. In either case, the turbine controllers are essentially computational units that receive data from sensors and other detection devices associated with their respective turbines, as well as instructions from the PPC. The controllers are typically also responsible for sending control signals to the various wind turbine components in a continual monitoring and adjustment of turbine operation. As will be clear to the skilled person, one or more of the method steps of this invention as defined above may be implemented by these local controllers. Other steps may be carried out centrally, for example by a PPC, and others still may be performed equally validly by any control unit within a plant. In the interests of clarity, the following description makes definite reference to one or the other control means in the discussion of each step. It will be understood, however, that the invention encompasses the use of any suitable control arrangement, or combination of these, for performing the various method steps.

The group of wind turbines may be a WPP such as WPP 1 of FIG. 1, or may alternatively correspond to a group of turbines within a larger wind power installation. Preferably, LUEs are calculated for at least one component of every turbine in the group. This is not essential, however, and the invention also finds application in methods in which the plurality of turbines for which the LUEs are provided consists instead of a subgroup of the set of turbines to which the power reduction request applies. For example, one or more subgroups of turbines may be found to be experiencing similar wind conditions for a significant proportion of the time. In cases such as those, LUEs may be calculated explicitly only for one of the turbines in each of the subgroups; for instance, one turbine may be considered to be representative of the subgroup in terms of rates of wear. The measured LUE or LUEs may then be used to infer approximate values of life consumption for corresponding components of the remaining turbines in the group.

Preferred embodiments of the invention further comprise a step of determining a required level for the output power and determining the power set points to reduce the output power to the required level. In some cases, the required level is specified by the request itself. By way of example, where the group of wind turbines is a WPP, the request to reduce power may be a curtailment command from an operator of a utility grid, and the required level for the output power may be specified, directly or indirectly, by the curtailment command. For instance, a utility operator may wish the power to be curtailed in view of low levels of demand for electricity. In that case, the operator may use information relating to demand, as well as to the current levels of power that it is receiving from the WPP, to formulate a specific instruction to the PPC to lower the quantity of electricity provided by a definite proportion or specific amount. Alternatively, where there exist contractual quotas on the power output of the WPP, the request from the utility may simply indicate that these maximum levels have been exceeded and that control action should be taken accordingly.

In other embodiments, the request to reduce power may be an alarm signal from the group of wind turbines. A primary goal in this case will often be simply to reduce the power to a safe level as swiftly as possible. In these and other cases, where a required power level is not provided explicitly a suitable maximum level may instead be inferred in view of the particular circumstances.

Where a target power level is given or deduced, methods according to the invention preferably further include the steps of receiving a signal indicative of current power generation by one or more of the group of wind turbines, estimating a current total output power of the group based on the signal, determining a difference between the estimated current total output power and the required level for the output power, and determining the power set points based on the difference. With this approach, the power may be lowered more swiftly and/or more accurately to the target level.

Preferred embodiments of the invention implement a feedback loop. Specifically, the method in these examples further includes, at pre-determined time intervals after providing the power set points to the subset of turbines, the steps of estimating a revised current total output power of the group of wind turbines, comparing the revised current total output power to the required level, and revising a power set point of one or more of the group of turbines to adjust the total output power if the estimated current total output power is different from the required level. The methods of some embodiments additionally repeat the steps of comparing LUEs to a threshold value and identifying the subset of turbines for which revised power set points should be provided.

This iteration of some or all of the method steps may advantageously mean that the output power is reduced more accurately to the specified value. Furthermore, in these and other embodiments the feedback loop may additionally determine whether the power generation of the group of turbines is more than a pre-determined amount lower than the maximum level allowed by the request. If it is, renewed power set-points may be generated to raise the output once more. In this way, the greatest permissible amount of energy may be extracted from the wind and the profitability of the group of turbines may be maximised.

As described above, in order to identify a subset of wind turbines for which the power is to be reduced, the measured LUEs for a particular component are compared to a threshold value for that component.

In some embodiments, the threshold value for life usage is an expected value of life usage for the component in question. In preferred embodiments, the expected value is based on an operational lifetime of the turbines. Here, by 'operational lifetime' is meant the time that has elapsed since the turbines commenced operation. In some preferred embodiments, the comparison of measured and expected values for life usage is performed centrally. This arrangement may advantageously be simpler to implement, as it is then only necessary to program a single control unit with the pre-defined threshold values as a function of turbine age. This is only one example, however, and the LUEs may instead be compared to the threshold values by the turbine controllers. The turbine controllers may then communicate to the PPC which components, if any, of the respective turbines are depreciating more quickly than expected.

In other preferred embodiments, the step of providing the threshold value comprises comparing two or more of the measures of life usage and choosing the threshold value based on the comparison. This approach may provide the advantage that turbine power output is reduced on the basis of a comparison of fatigue life consumption to a value that more realistically reflects the average wear across the turbine group. Furthermore, the method in these examples may identify the turbines that are experiencing the greatest amounts of wear irrespective of the absolute levels of the LUEs. This may be particularly advantageous, for example, if the turbines generally are experiencing wear at below-expected levels. As one example, the threshold level for a given component in a particular iteration of the method may be defined to be the median value of the LUEs measured for that component among the turbines. In this way, half of the turbines will necessarily be identified as falling into the subset. Thus, embodiments of the invention may advantageously mean that the request to reduce power is met with regardless of how the measured LUEs compare with expected values.

In yet further embodiments, a step of comparing LUEs from the various individual turbines may follow a step of comparison to expected levels of wear.

Preferably, turbine components for which a measure of life usage is provided include one or more of the turbine blade structure, blade pitch system components, main shaft, main shaft bearing, tower, foundation, yaw system components, converter, power cables, blade bearings, gearbox, generator and transformer.

In preferred embodiments of the invention the life usage algorithm is chosen from a load duration algorithm, a load revolution distribution algorithm, a rainflow counting algorithm, a stress cycle damage algorithm, a temperature cycle damage algorithm, a generator thermal reaction rate algorithm, a transformer thermal reaction rate algorithm and a bearing wear algorithm. In other examples, different algorithms may be used. Moreover, a library of suitable algorithms may be provided to the PPC or to turbine controllers. Such a library may then continuously be updated to incorporate new or improved algorithms as these become available. The use of a library can also advantageously mean that life usage estimation for a new turbine part may easily be implemented simply by choosing from among the available algorithms and providing the required component-specific parameters.

Additionally, in some embodiments rates of component life usage may be determined and may in turn be compared to appropriate threshold values. For example, the PPC may identify turbines having components that are fatiguing at above-average rates. It may be preferred to use this approach in isolation, or an analysis of rates of wear may instead be used to supplement one of absolute values of life usage.

Thus, methods of the invention provide real-time estimates of the consumption of fatigue life by wind turbine components to decrease the power generated by individual turbines in a group preferentially in response to a request to reduce the output power of the group.

According to the invention there is also provided a control arrangement for controlling a group of wind turbines, comprising at least one life usage estimation unit for determining a measure of life usage by a component of each of a plurality of the turbines by applying a life usage algorithm to values of variables affecting the life usage, the values being obtained using sensors on the wind turbines; a central control unit for receiving the measures of life usage, determining a threshold value for the measures of life usage and identifying a subset of the plurality of turbines, the subset comprising turbines having a component with a life usage greater than the threshold value; and a power control unit for providing a power set point for each of the turbines in the subset identified by the central control unit to reduce a power generation of the turbines.

Examples of the functioning of each of the elements of the control arrangement according to the invention are described above with reference to the method of the invention.

The invention also resides in a group of turbines provided with an arrangement as defined above.

BRIEF DESCRIPTION OF THE DRAWINGS

The invention will now be described, by way of example only, with reference to the accompanying drawings in which.

DETAILED DESCRIPTION OF PREFERRED EMBODIMENTS

As discussed above, embodiments of the invention are characterised by a real-time estimation of the wear experienced by wind generator components, and by the use of this information in providing an improved strategy for reducing the output power of a group of turbines. In the following, a first embodiment of a method according to the invention will be described in detail in the context of power curtailment of a WPP in response to a power curtailment command from a utility grid, following a brief summary of its various steps. As mentioned previously, the request to reduce power may instead originate within the WPP itself; for instance, the request may take the form of an alarm signal in response to which swift control action is required. This invention and the description thereof find equal application also to this latter type of situation.

Figure 1:
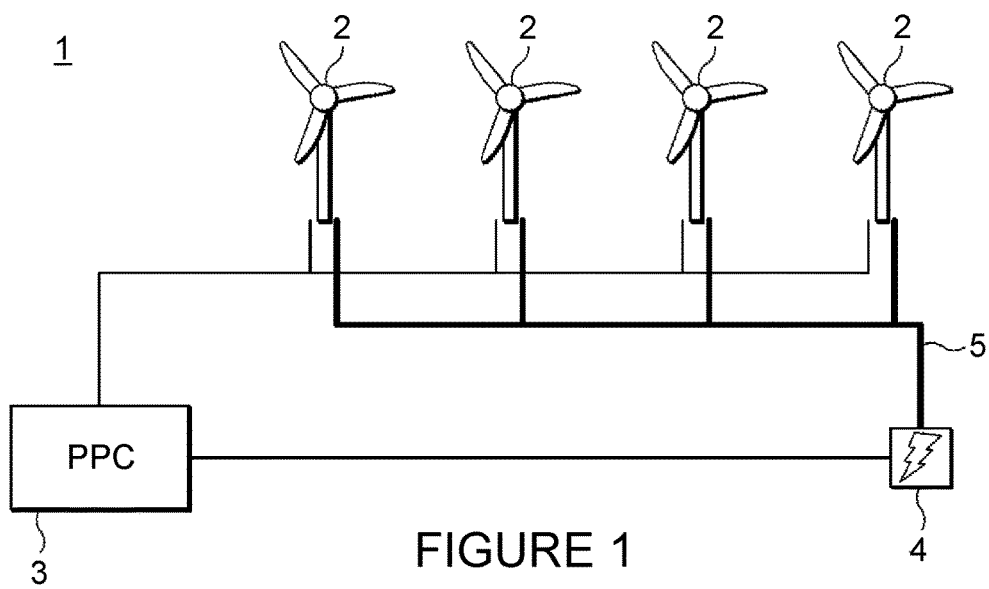
FIG. 1 is a schematic illustration of a known WPP control regime using a PPC.
Figure 2:
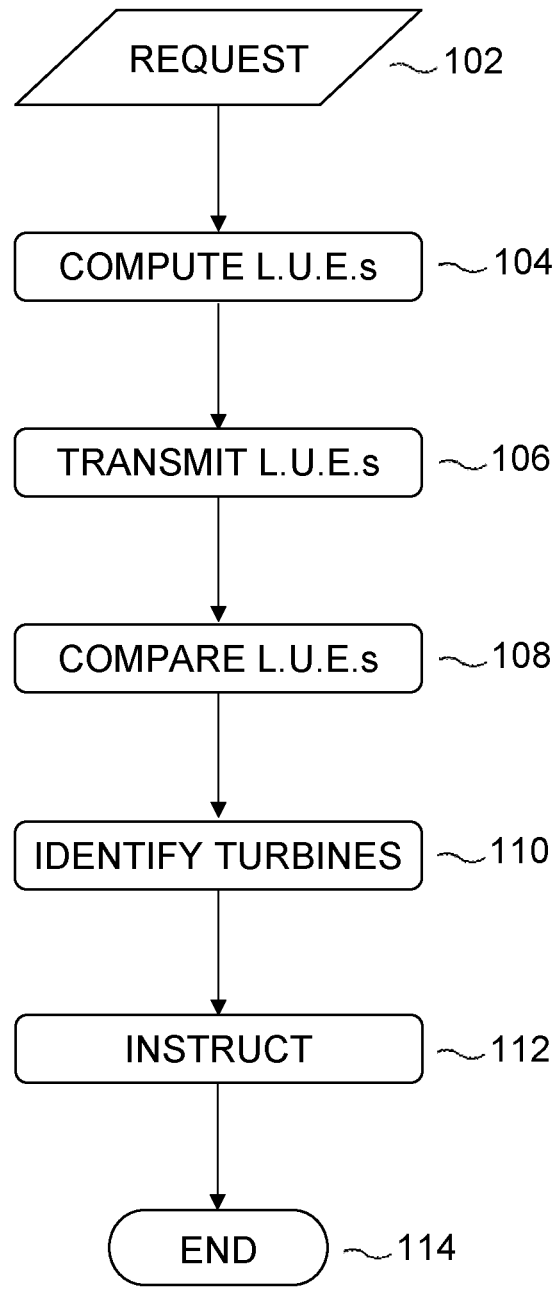
FIG. 2 is a flow chart of a method for reducing output power of a group of turbines according to a first embodiment of the present invention.

FIG. 2 is a flow-chart illustrating a method 100 for reducing the power output to a utility grid by a WPP according to a first embodiment of the invention. The method is shown as a directed sequence for convenience alone; as will be appreciated by the skilled person, the order in which many of the steps illustrated are performed is immaterial. Indeed, in many realisations of the method the timings of many of the steps will in practice overlap.

In a first step 102, which may be considered a start point, a request to curtail the output power of the WPP is received by a PPC for the plant. At step 104, local controllers for each wind turbine in the plant are invoked to compute an LUE for at least one component of the corresponding turbine by applying life usage algorithms to values of operational loads that are routinely measured by sensors on each turbine. The LUEs are sent to the PPC at step 106.

At step 108, the PPC compares every estimate of life consumption that it has received to a threshold value for the wear of the associated component. At step 110, those turbines having at least one component with an actual life usage that is found to be greater than the threshold value are identified. The PPC then broadcasts, at step 112, an instruction to each of the identified wind generators to reduce their operating power level, and the process ends at step 114.

Turning now to a more detailed discussion of each of the steps outlined above, as discussed in the summary of the invention the request received at step 102 may or may not specify an amount by which the power is to be reduced. For the purposes of the present discussion, it will be assumed that the request merely indicates that the output power of the WPP must be cut back.

As mentioned, in methods according to the first embodiment the calculation of the LUEs at step 104 is performed individually for each turbine within the WPP. Specifically, the controllers provided to individual turbines are each made to include a life usage estimation unit for outputting an estimate of the wear undergone by one or more turbine components. As will be discussed in further detail below, the LUEs for the turbine components of interest are calculated on the basis of signals indicative of the various loads that these components experience. These signals are provided by appropriate sensors, which determine the loads in the known manner and communicate them to the life usage estimation unit within the turbine controller.

Though it may appear advantageous to calculate LUEs for as many wind turbine components as possible, in practice it is not feasible to measure all load signals on every component of every turbine within a WPP. Instead, in the first embodiment LUEs are computed only for the major components of each turbine, namely the blade structure, blade pitch system components, main shaft and main shaft bearing, tower, foundation, yaw system components, converter, power cables, blade bearings, gearbox, generator and electrical power systems transformer. In other embodiments, any or all of these components may be omitted and/or others included, as desired.

In the first embodiment, existing sensors are used to provide the signals taken as inputs for the calculations of life usage. Thus, for example, it is common to measure directly the flapwise and edgewise bending moments at the root of a wind turbine blade; these measurements are therefore used in several of the life usage calculations described below. Similarly, an LUE for the pitch system is based on the pitch force, a value for which can be obtained directly from a measured value of the pressure in a first chamber of the cylinder and an inferred value of the pressure in a second chamber of the cylinder. These are to be understood as examples only; in other embodiments, where a value for a parameter cannot be inferred with sufficient accuracy, it may be preferred to measure this value directly using one or more additional sensors.

Once the load measurements have been obtained, the manner in which these are processed to arrive at an estimation of life consumption will vary from component to component. A range of well-known algorithms exists for this purpose, and in this embodiment the controllers of the WPP turbines are made to include a library of such algorithms for on-line estimation of component life usage. In this particular example, the library includes load duration, load revolution distribution, rainflow counting, stress cycle damage, temperature cycle damage, generator thermal reaction rate, transformer thermal reaction rate and bearing wear algorithms.

Thus, the life estimation unit for a turbine inputs the load measurements that it receives for each component of interest into an appropriate algorithm chosen from the library. By way of example, in this embodiment rainflow counting and stress cycle damage algorithms are used to estimate the fatigue life consumed by the blade structure. Specifically, the count is applied to the flapwise and edgewise bending moments measured at the root of the blade in order to identify the range and mean value of the blade stress cycle, and these parameters are then input into the stress cycle damage algorithm for calculation of the LUE. In a similar way, a rainflow count is used to obtain a range and mean value of the moments on one or more blade bolts, which are again sent to the stress cycle damage algorithm for estimation of life usage.

The stress cycle damage algorithm is further applied to values for the average stress and the range of the stress cycle in each of the pitch system, the main shaft, the tower and the foundation. These parameters are identified by applying the rainflow algorithm to the pitch force, the main shaft torque, the tower stress and the foundation stress, respectively. Similarly, an LUE for the yaw system is calculated by applying a rainflow count to the torsion measured at the top of the tower to obtain a value for the load duration, which is again sent as an input to the stress cycle damage algorithm.

Turning next to the converter, indications of generator power and RPM are used to infer a local temperature, and again rainflow counting is applied to this temperature to obtain values for the average and range of its cycles. These parameters are then input to the temperature cycle damage algorithm. Similar processing of cable temperature measurements is used to obtain an estimate of the extent to which cable insulation has been consumed by the operation of the turbine to date. The estimation of life usage of polymer cable insulation may be based, for example, on Arrhenius's law for the temperature dependence of reaction rates.

In this example, an LUE for the blade bearings is obtained from measurements of the flapwise blade root bending moments and of pitch velocity by means of a load duration algorithm. In an alternative embodiment, these same measurements could instead be sent to a bearing wear algorithm. The load revolution distribution algorithm is applied to the main shaft torque to calculate the life usage of the gearbox. Finally, LUEs for the generator and the transformer are obtained by applying the corresponding thermal reaction rate algorithms to temperatures inferred from the generator RPM and from the power and ambient temperature, respectively.

As mentioned above, the algorithms described are among those known in the art. Particular reference is made to the following standards and texts:

Load revolution distribution and load duration:
*Guidelines for the Certification of Wind Turbines*, Germanischer Lloyd; Section 7.4.3.2
Rainflow counting:
International standard IEC 61400-1: *Wind turbines—Part 1: Design Requirements*; Annex G
Transformer and generator life usage:
International standards IEC 60076-5 and IEC 60076-12: *Power transformers—Part 5: Loading Guide for Oil-Filled Power Transformers and Part 12: Loading Guide for Dry-Type Power Transformers*
International standard ISO 6336-6: Calculation of load capacity of spur and helical gears—Part 6: Calculation of service life under variable loads In this example, measurements of life usage are continuously updated in order that the overall condition of the turbines may be monitored throughout their operation. The frequency with which the life usage of a given component is measured will vary, but in the present example is on the order of tens of minutes. Methods according to alternative embodiments may include a further step of determining, in addition to an absolute value of life usage, the rate at which the design life of one or more components is being consumed. This estimation may be renewed every minute, for example. By constantly reviewing the estimates of life usage, the decision at step 110 as to which turbines it is most advantageous to de-rate in order to meet with the power reduction request may be made on the basis of accurate and up-to-date information regarding the condition of the various wind turbines in the group.

In order to balance the life usage of the various turbines within the WPP, in the first embodiment of the invention the PPC is programmed with expected values of life usage for the various turbine components of interest, which are based on the operational lifetime of the turbines. At step 108, the PPC compares each LUE received from the turbines with the appropriate reference value. In this way, the PPC is able to derive, at a given time, information as to which components of which turbines have consumed a greater-than-expected proportion of the wear that their engineering permits. The turbines to which those components belong can then be identified, at step 110, as a subset of turbines from which output power should preferentially be reduced in order to meet with the power reduction request received at step 102.

Turning finally to step 112, reduced power set points are generated for the chosen turbines. More specifically, in this embodiment the PPC sends an instruction to the controller of each of the turbines in the subset identified as described above to reduce their power output by a pre-determined amount. The PPC may selectively broadcast an instruction to lower power generation by 10 kW, for example. The turbine controllers then lower the power set points for their respective turbines by the instructed amount. The required decrease in power is realised by the turbine controller adjusting the operating set points of the corresponding turbine as appropriate, and the process ends at step 114.

Figure 3:
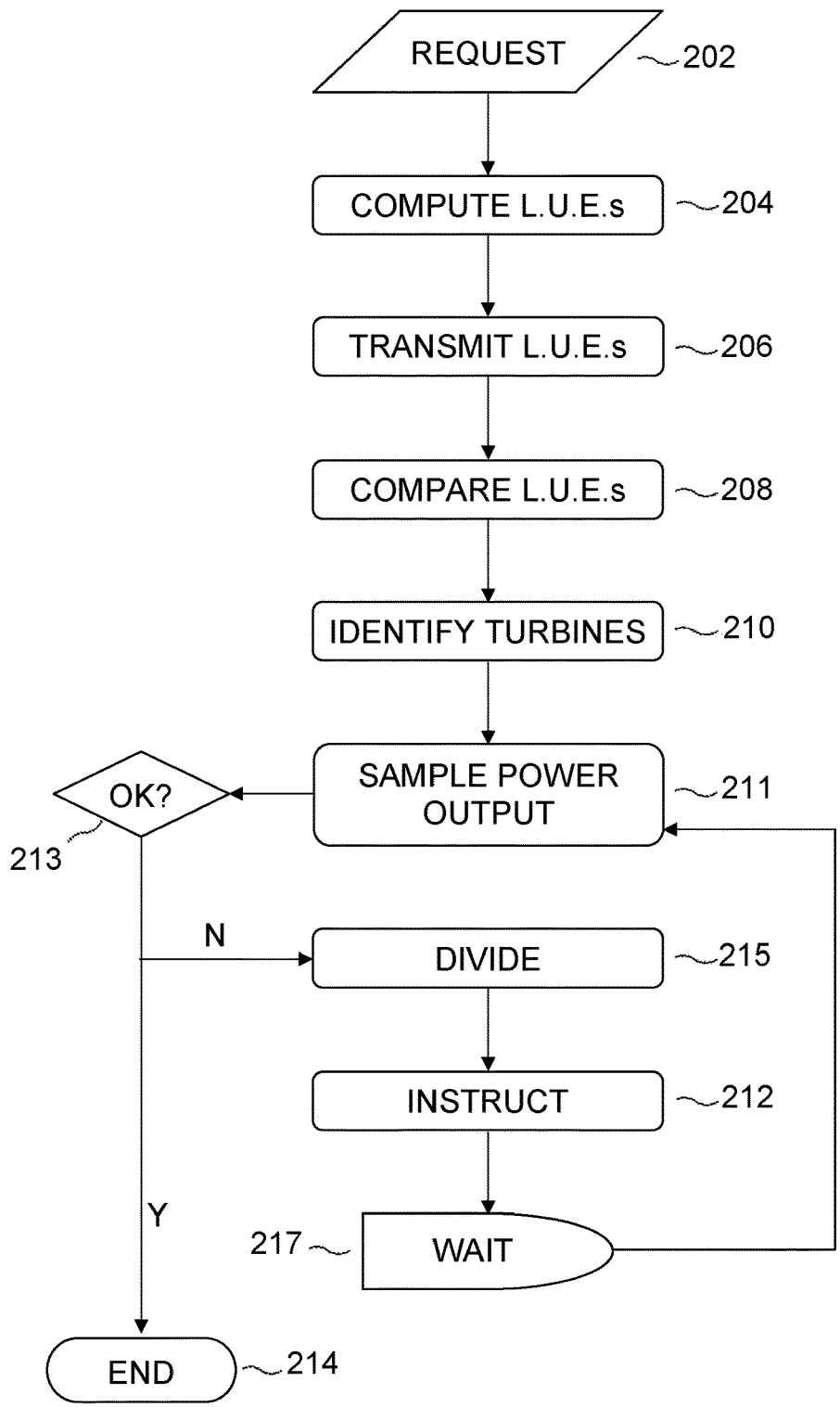
FIG. 3 is a flow chart of a method for reducing output power of a group of turbines according to a second embodiment of the present invention.

A method 200 according to a second embodiment of the present invention is illustrated schematically in the flowchart of FIG. 3. This example includes steps 202, 204, 206, 208, 210, 212 and 214 analogous to steps 102, 104, 106, 108, 110, 112 and 114 of the method 100 of the first embodiment described above. The method 200, however, additionally incorporates further steps that refine the instruction of the turbines by the PPC and that implement a feedback system, as will now be described.

As mentioned previously, demands or requests to a PPC to reduce the output power of a WPP may specify explicitly that the power must be decreased by a definite amount or to an absolute value. In the following discussion, it will again be assumed that the group of turbines is a WPP and that request 202 is substantially a curtailment demand from a utility grid. However, in this example the demand includes an instruction to lower the output power of the plant to a pre-determined level.

As was also mentioned earlier, the controller of a wind turbine will typically transmit data indicative of the operational configuration of that turbine back to the central controller of a WPP. Thus, in the method of FIG. 3, the total output power of the WPP is sampled by the PPC at step 211 by summing signals representative of actual turbine-level power generation. At decision step 213, the PPC compares this total output to the power level specified in request 202. If the total output power of the turbine is not higher than this received limit, the process ends (step 214). If, conversely, the request is not satisfied, the PPC divides the required reduction in power among the turbines identified at step 210.

To illustrate, if the WPP is required to lower output power by 1 MW, and the subset of turbines identified at step 210 comprises twenty turbines, the PPC may decide to reduce the power generated by each of these twenty turbines by 50 kW. The required curtailment may be divided equally among the identified subset of turbines, as in this example, or the PPC may instead distribute the power reduction differently. For example, each turbine in the subset may be de-rated in proportion to the amount by which its life usage exceeds the corresponding threshold. Once this decision has been made, the turbines are instructed in a similar way to that described above with reference to FIG. 2.

Figure 4:
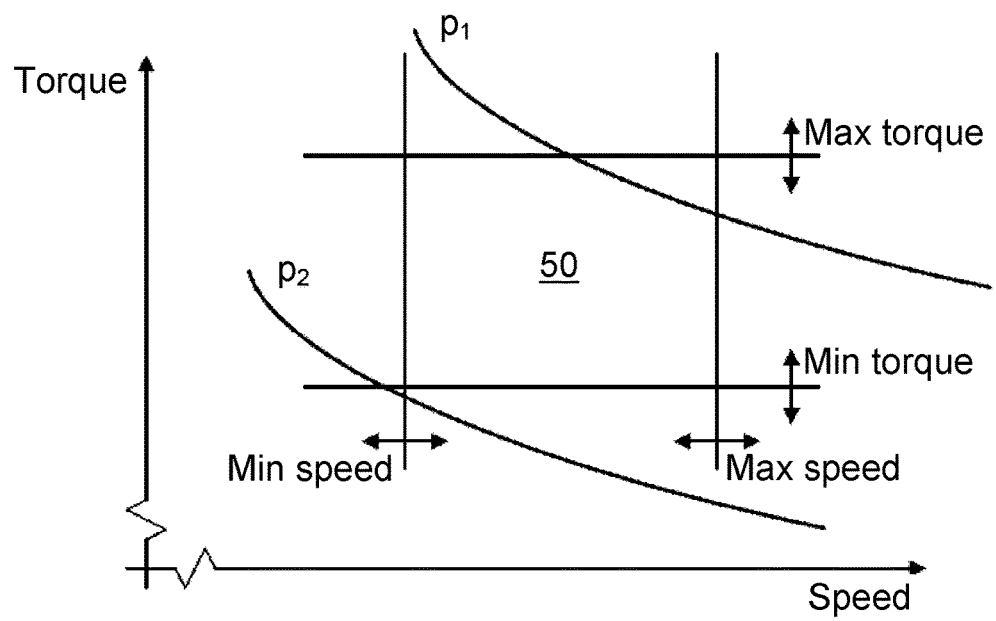
FIG. 4 is a graph of torque against speed for a typical wind turbine, showing operating constraints for the turbine.

FIG. 4 is a graph of torque as a function of speed for a typical wind turbine generator. Curves $p_1$ and $p_2$ are lines of constant power, each corresponding to operation at a power set point. A power reduction or de-rating command manifests as a shift in the power set point to a new, lower value, for example from current level $p_1$ to new level $p_2$. The turbine controller must then select an operating speed and torque for the turbine to deliver the new level of power. It should be noted that although generator speed is plotted on the graph, the term 'speed' as used in the following description may equally refer to the rotational speed of the rotor or of any point along the drive train; although the absolute values are different, these are all related.

A turbine is characterised by hard constraints, defined as the maximum and minimum torque and speed at which it can operate. These constraints are imposed by the controller and dictated by factors such as noise limits and gearbox lubrication, for example. These constraints are referred to as 'hard' because they are absolute: they cannot ordinarily be violated, with the exception of the extreme case of performing a shutdown. It should be noted that although these constraints are rigid in this sense, they may conversely vary over time.

Thus, a box 50 within which the turbine can operate is shown on the graph of FIG. 4. As can be seen, the permissible operation of the turbine is bound by hard maximum and minimum values of speed and torque. In particular, it can be seen from the drawing that the turbine cannot achieve operation at any point on the constant power curve $p_2$, which is at all times outside the box 50. Where a command from the PPC to reduce power generation amounts to an instruction to de-rate to power level $p_2$, therefore, a turbine may be unable to satisfy the command. In this case, the turbine controller in the present embodiment instead adjusts the operational speed and torque of the turbine to correspond to the minimum allowed levels shown on the graph of FIG. 4; that is, the turbine operates at values of speed and torque corresponding to the bottom left hand corner of box 50.

In view of the hard minimum constraints illustrated in FIG. 4, the total reduction in power that is realised by a subset of turbines instructed to de-rate as described above may, in practice, be lower than expected. This may be further compounded if individual turbines within the subset targeted for power reduction are currently shut down for maintenance, for example. Those turbines are in effect redundant for the purposes of control decisions. Thus, in the method 200 of this second embodiment, after a preset time interval has passed following the issuance of the power de-rating instruction, indicated by delay step 217, the PPC returns to step 211 to re-evaluate the total power output of the WPP. If for any reason the curtailment demand has still not been met with, the process of dividing the (remaining) required power reduction among the most fatigued turbines is repeated.

In other embodiments, a feedback loop may be implemented in methods, such as method 100 of the first embodiment described above, that do not actively include a stage corresponding to allocation step 215, but which instead simply broadcast a pre-set power reduction instruction to the turbines identified at step 210.

Moreover, in method 200 as described above, the PPC checks at step 213 whether the current total output power of the group of wind turbines exceeds a maximum permitted level. As explained in the summary of the invention, in other embodiments the decision step 213 is generalised, and instead determines whether the current level of power generation is equal to the level received at step 202. Thus where a power reduction instruction 112 or 212 has resulted in the total output of the turbine group falling significantly below a level that can be accepted onto a grid, for example, the PPC may issue one or more control signals to raise the output towards that level once more. As mentioned, this approach may advantageously maximise the profit of the wind turbine group or WPP, compatibly with the overarching need to cap the electricity generated.

The invention claimed is:

1. A method for reducing a collective output power of a plurality of wind turbines, the method comprising:
    acquiring, using one or more sensors of the plurality of wind turbines, values of one or more variables affecting a life usage of components of the plurality of wind turbines;
    for each wind turbine of the plurality of wind turbines, determining a measure of the life usage of at least one component of the wind turbine by applying a life usage algorithm to the values of the one or more variables;
    identifying, responsive to a request at a power plant controller to reduce the collective output power, a subset of one or more wind turbines of the plurality of wind turbines, wherein each of the one or more wind turbines has a component with a corresponding life usage that is greater than a threshold value; and
    communicating one or more power set points from the power plant controller to one or more wind turbine controllers of the one or more wind turbines,
    wherein the one or more power set points configure the one or more wind turbine controllers to reduce a power generation of the one or more wind turbines proportional to an amount by which the corresponding life usage exceeds the threshold value.

2. A method according to claim 1 further comprising:
    determining a required level for the collective output power; and determining the one or more power set points to reduce the collective power output to the required level.

3. A method according to claim 2 further comprising, prior to communicating the one or more power set points:
receiving a signal indicative of current power generation by one or more of the plurality of wind turbines;
estimating, based on the signal, a current total output power of the plurality of wind turbines;
determining a difference between the estimated current total output power and the required level for the collective output power; and
determining the one or more power set points based on the difference.

4. A method according to claim 2 further comprising, at pre-determined time intervals after communicating the one or more power set points:
estimating a revised current total output power of the plurality of wind turbines;
comparing the revised current total output power to the required level; and
when the estimated current total output power is different from the required level, revising at least one of the one or more power set points to adjust the collective output power.

5. A method according to claim 2 wherein:
the plurality of wind turbines are included in a wind power plant;
the request to reduce the collective output power is a curtailment command from an operator of a utility grid; and
the required level for the collective output power is specified, directly or indirectly, by the curtailment command.

6. A method according to claim 1 wherein the request to reduce the collective output power comprises an alarm signal from the plurality of wind turbines.

7. A method according to claim 1 wherein the threshold value comprises an expected value of life usage for the component.

8. A method according to claim 7 wherein the expected value is based on an operational lifetime of the plurality of wind turbines.

9. A method according to claim 1 further comprising:
comparing two or more of the measures of the life usage; and
selecting the threshold value based on the comparison.

10. A method according to claim 1 wherein the component of the wind turbine comprises one of a blade structure, a blade pitch system component, a main shaft, a main shaft bearing, a tower, a foundation, a yaw system component, a converter, a power cable, a blade bearing, a gearbox, a generator, and a transformer.

11. A method according to claim 1 wherein the life usage algorithm comprises one of a load duration algorithm, a load revolution distribution algorithm, a rainflow counting algorithm, a stress cycle damage algorithm, a temperature cycle damage algorithm, a generator thermal reaction rate algorithm, a transformer thermal reaction rate algorithm, and a bearing wear algorithm.

12. A control arrangement for controlling a plurality of wind turbines, the control arrangement comprising:
at least one life usage estimation unit configured to:
acquire, using one or more sensors of the plurality of wind turbines, values of one or more variables affecting a life usage of components of the plurality of wind turbines; and
determine, for each wind turbine of the plurality of wind turbines, a measure of the life usage of at least one component of the wind turbine by applying a life usage algorithm to the values of the one or more variables;
a central control unit configured to:
receive the measures of the life usage; and
identify, responsive to a request to reduce a collective output power of the plurality of wind turbines, a subset comprising one or more wind turbines of the plurality of wind turbines, wherein each of the one or more wind turbines has a component with a corresponding life usage that exceeds a threshold value; and
a power control unit configured to:
communicate one or more power set points to one or more wind turbine controllers of the one or more wind turbines,
wherein the one or more power set points configure the one or more wind turbine controllers to reduce a power generation of the one or more wind turbines proportional to an amount by which the corresponding life usage exceeds the threshold value.

13. A system, comprising:
a plurality of wind turbines; and
a control arrangement for controlling the plurality of wind turbines, the control arrangement comprising:
at least one life usage estimation unit configured to:
acquire, using one or more sensors of the plurality of wind turbines, values of one or more variables affecting a life usage of components of the plurality of wind turbines; and
determine, for each wind turbine of the plurality of wind turbines, a measure of the life usage of at least one component of the wind turbine by applying a life usage algorithm to the values of the one or more variables;
a central control unit configured to:
receive the measures of the life usage; and
identify, responsive to a request to reduce a collective output power of the plurality of wind turbines, a subset comprising one or more wind turbines of the plurality of wind turbines,
wherein each of the one more wind turbines has a component with a corresponding life usage that exceeds a threshold value; and
a power control unit configured to:
communicate one or more power set points to one or more wind turbine controller of the one or more wind turbines,
wherein the one or more power set points configure the one or more wind turbine controllers to reduce a power generation of the one or more wind turbines proportional to an amount by which the corresponding life usage exceeds the threshold value.

* * * * *